(12) United States Patent
Qi et al.

(10) Patent No.: US 11,489,644 B2
(45) Date of Patent: Nov. 1, 2022

(54) APPARATUS AND METHOD FOR PROVIDING DENSITY OF PT-RS

(71) Applicant: Samsung Electronics Co., Ltd., Suwon-si (KR)

(72) Inventors: Yinan Qi, Staines (GB); Mythri Hunukumbure, Staines (GB)

(73) Assignee: Samsung Electronics Co., Ltd., Suwon-si (KR)

(*) Notice: Subject to any disclaimer, the term of this patent is extended or adjusted under 35 U.S.C. 154(b) by 166 days.

(21) Appl. No.: 16/969,957

(22) PCT Filed: Feb. 15, 2019

(86) PCT No.: PCT/KR2019/001888
§ 371 (c)(1),
(2) Date: Aug. 13, 2020

(87) PCT Pub. No.: WO2019/160378
PCT Pub. Date: Aug. 22, 2019

(65) Prior Publication Data
US 2021/0367734 A1    Nov. 25, 2021

(30) Foreign Application Priority Data

Feb. 16, 2018  (GB) .................................. 1802545
Dec. 13, 2018  (KR) ....................... 10-2018-0161224

(51) Int. Cl.
*H04L 5/00*     (2006.01)
*H04L 1/00*     (2006.01)

(52) U.S. Cl.
CPC .......... *H04L 5/0053* (2013.01); *H04L 1/0016* (2013.01); *H04L 5/0007* (2013.01)

(58) Field of Classification Search
CPC .... G01S 5/0289; G01S 5/0252; H04W 88/08; H04W 72/042; H04W 72/1289
See application file for complete search history.

(56) References Cited

U.S. PATENT DOCUMENTS

2016/0142518 A1* 5/2016 Raina ...................... H04L 69/04
                                                                      370/230
2019/0356463 A1* 11/2019 Zhang ................... H04L 5/0048
(Continued)

FOREIGN PATENT DOCUMENTS

WO        2018/027222 A1     2/2018

OTHER PUBLICATIONS

Ericsson, "Remaining details on PTRS design", 3GPP TSG RAN WG1 Meeting 91, Nov. 27-Dec. 1, 2017, R1-1720741, 15 pages.
(Continued)

*Primary Examiner* — Hoang-Chuong Q Vu (57) ABSTRACT

Provided is a method and apparatus for providing information related to density of a PT-RS in a wireless communication system. The operation method of a base station may include: configuring a phase tracking reference signal (PT-RS) corresponding to a terminal; and transmitting time and frequency density information of the PT-RS to the terminal, and the time and frequency density information of the PT-RS is configured based on threshold values of time and frequency density of the PT-RS which are compressed based on at least one of a uniform sampling grid scheme, a non-uniform sampling grid scheme, a combinational indexing scheme, or a scheme of imposing a limit on a threshold value. Other embodiments may be possible.

10 Claims, 3 Drawing Sheets

(56) References Cited

U.S. PATENT DOCUMENTS

2020/0092908 A1\* 3/2020 Li .................... H04W 72/14
2021/0297204 A1\* 9/2021 Davydov ............ H04W 72/048

OTHER PUBLICATIONS

Samsung et al., "WF on Value Ranges for PT-RS Density Tables", 3GPP TSG RAN WG1 Meeting #92, Apr. 15, 2018, R1-1803457, 3 pages.
Supplementary European Search Report dated Feb. 22, 2021 in connection with European Patent Application No. 19 75 5001, 10 pages.
National Instruments, "Discussion on explicit and implicit signaling for PT-RS", 3GPP TSG RAN WG1 Meeting #89, May 15-19, 2017, R1-1708272, 11 pages.
Ericsson, "Summary of PTRS open issues", 3GPP TSG RAN WG1 Meeting #91, Nov. 27-Dec. 1, 2017, R1-1721441, 9 pages.
Ericsson, "Feature lead summary 3 of PT-RS", 3GPP TSG RAN WG1 Meeting AH 1801, Jan. 22-26, 2018, R1-1801244, 7 pages.
NEC, "Remaining issues on PTRS configurations", 3GPP TSG RAN WG1 Meeting #92, Feb. 26-Mar. 2, 2018, R1-1801902, 2 pages.
International Search Report dated May 24, 2019 in connection with International Patent Application No. PCT/KR2019/001888, 3 pages.
Written Opinion of the International Searching Authority dated May 24, 2019 in connection with International Patent Application No. PCT/KR2019/001888, 5 pages.

\* cited by examiner

APPARATUS AND METHOD FOR PROVIDING DENSITY OF PT-RS

CROSS-REFERENCE TO RELATED APPLICATIONS

This application is a 371 of International Application No. PCT/KR2019/001888 filed on Feb. 15, 2019, which claims priority to United Kingdom Patent Application No. 1802545.2 filed on Feb. 16, 2018 and Korean Patent Application No. 10-2018-0161224 filed on Dec. 13, 2018, the disclosures of which are herein incorporated by reference in their entirety.

BACKGROUND

1. Field

The disclosure relates to a phase tracking reference signal (PT-RS) in a wireless communication system, and more particularly, to a method and apparatus for providing information associated with density of a PT-RS in a wireless communication system.

2. Description of Related Art

In order to meet wireless data traffic demands that have increased after commercialization of the $4^{th}$ generation (4G) communication system, efforts to develop an improved $5^{th}$ generation (5G) communication system or a pre-5G communication system have been made. For this reason, the 5G communication system or the pre-5G communication system is called a beyond 4G network communication system or a post LTE system.

In order to achieve a high data transmission rate, implementation of the 5G communication system in an ultra-high frequency (mmWave) band (e.g., 60 GHz band) is being considered. In the 5G communication system, technologies such as beamforming, massive multi-input multi-output (MIMO), full dimensional MIMO (FD-MIMO), array antenna, analog beam-forming, and large scale antenna technologies are discussed to mitigate a transmission path loss of electric waves and to increase a transmission distance of electric waves in the ultra-high frequency band.

Further, in the 5G communication system, technologies such as an evolved small cell, an advanced small cell, a cloud radio access network (cloud RAN), an ultra-dense network, device to device communication (D2D), a wireless backhaul, a moving network, cooperative communication, coordinated multi-points (CoMP), and received interference cancellation have been developing to improve the system network.

In addition, in the 5G system, advanced coding modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA) have been developing.

In a wireless communication system using an ultra-high frequency band (mmWave) such as the 5G communication system, signal attenuation may significantly occur due to phase noise occurring in the ultra-high frequency band. Particularly, in the wireless communication system, a common phase error (CPE) which happens to an adjacent time sample and inter-carrier interference (ICI) of the frequency domain, which occur due to phase noise, may result in signal attenuation, whereby signal restoration capability may dramatically decrease. Accordingly, the wireless communication system that uses an ultra-high frequency band may use a phase tracking reference signal (PT-RS) which is a new reference signal used for tracking phase noise in order to perform phase noise compensation.

When a PT-RS is used in the wireless communication system, nodes (e.g., a base station and a terminal) included in the wireless communication system may share information related to the PT-RS. For example, the nodes included in the wireless communication system may share the density of the time domain and the density of the frequency domain of the PT-RS. Accordingly, overhead may occur in association with resources that the nodes use for sharing the density of the PT-RS in the wireless communication system.

The disclosure may provide a method and apparatus for providing the density of the PT-RS in the wireless communication system.

The disclosure provides a method and apparatus for reducing overhead associated with threshold values used for deriving time and frequency density of a PT-RS in the wireless communication system.

The disclosure provides a method and apparatus for encoding and compressing threshold values used for deriving time and frequency density of a PT-RS in the wireless communication system.

SUMMARY

Embodiments should not be limited by the above-described embodiments, and other embodiments which are not mentioned would be understood by those skilled in the art on the basis of the disclosure provided below.

According to various embodiments, there is provided a method to improve encoding and/or compression of thresholds regarding PTRS density and, in particular to their use in PTRS density tables.

According to various embodiments, there is provided a method of reducing a signaling overhead in a telecommunication system comprising the step of compressing information associated with Phase Tracking Reference Signal, PTRS.

In an embodiment, one or more of RRC signaling and UE reporting signaling are reduced.

In an embodiment, the information associated with PTRS that is compressed comprises threshold information in one or more of an MCS table and a BW table.

In an embodiment, the step of compressing comprises reducing a value range of the threshold information.

In an embodiment, the step of compressing comprises utilizing a constant grid value.

In an embodiment, the step of compressing comprises non-uniform compression utilizing grid values of $2^m$.

In an embodiment, the step of compressing comprises combinatorial indexing.

According to various embodiments, there is provided a non-transitory data carrier carrying control code to implement the methods of the first aspect.

According to various embodiments, there is provided apparatus arranged to perform the method of the first aspect Embodiments of the disclosure adopt one or more approaches, relating to use of a uniform sampling grid, a grid matching the density values, combinational indexing or imposing a limit on each threshold value.

According to various embodiments, an operation method of a base station is provided, and the operation method may include: configuring a phase tracking reference signal (PT- RS) corresponding to a terminal; and transmitting time and frequency density information of the PT-RS to the terminal, and the time and frequency density information of the PT-RS is configured based on threshold values of time and frequency density of the PT-RS which are compressed based on at least one of a uniform sampling grid scheme, a non-uniform sampling grid scheme, a combinational indexing scheme, or a scheme of imposing a limit on a threshold value.

According to various embodiments, an operation method of a terminal is provided, and the operation method may include: configuring a phase tracking reference signal (PT-RS) corresponding to a base station; and transmitting time and frequency density information of the PT-RS to a base station, and the time and frequency density information of the PT-RS is configured based on threshold values of time and frequency density of the PT-RS which are compressed based on at least one of a uniform sampling grid scheme, a non-uniform sampling grid scheme, a combinational indexing scheme, or a scheme of imposing a limit on a threshold value.

According to various embodiments, a base station is provided, and the base station may include a transceiver, and a processor configured to perform control so as to configure a phase tracking reference signal (PT-RS) corresponding to a terminal and to transmit time and frequency density information of the PT-RS to the terminal, and the processor configures time and frequency density information of the PT-RS based on threshold values of time and frequency density of the PT-RS which are compressed based on at least one of a uniform sampling grid scheme, a non-uniform sampling grid scheme, a combinational indexing scheme, or a scheme of imposing a limit on a threshold value.

According to various embodiments, a terminal is provided, and the terminal may include a transceiver, and a processor configured to perform control so as to configure a phase tracking reference signal (PT-RS) corresponding to a base station, and to transmit time and frequency density information of the PT-RS to the base station, and the processor configures the time and frequency density of the PT-RS based on threshold values of the time and frequency density of the PT-RS which are compressed based on at least one of a uniform sampling grid scheme, a non-uniform sampling grid scheme, a combinational indexing scheme, or a scheme of imposing a limit on a threshold value.

In a wireless communication according to embodiments, threshold values used for deriving the time and frequency density of a PT-RS may be encoded and compressed using at least one of a uniform sampling grid scheme, a non-uniform sampling grid scheme, a combinational indexing scheme or a scheme of imposing a limit on a threshold, whereby overhead attributable to the use of the PT-RS may be reduced.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

Hereinafter, embodiments of the disclosure will be described in detail with reference to the accompanying drawings.

In describing the embodiments, descriptions of technologies which are already known to those skilled in the art and are not directly related to the disclosure may be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to complete the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. However, the "unit" or "module" does not always have a meaning limited to software or hardware. The "unit" may be configured either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. Functions provided by the elements and the "units" may be either combined into a smaller number of elements and "units" or further divided into a larger number of additional elements or "units". In addition, the elements and "units" may be implemented to reproduce one or more CPUs within a device or a security multimedia card.

Embodiments will be described in detail, mainly from the perspective of a predetermined radio access technology-based wireless communication system. However, the subject matter of the specification may be applied to other communication systems and services having a similar technical background without departing from the scope of the specification. Those skilled in the art could determine whether the subject matter of the specification is applicable.

The expressions, "first", "second", and the like in the document are used to describe various elements, but the elements are not limited by the terms. The terms are only used to distinguish one element from another. Therefore, a first element mentioned below could be termed a second element within the technical idea of the disclosure.

The embodiments will be described from the perspective of the configuration for sharing the density of a PT-RS between a base station and a terminal. Here, the base station may be a terminal node of a network that performs direct communication with a terminal. A predetermined operation which is described as an operation performed by the base station may be performed by an upper node of the base station depending on the case. That is, it is apparent that various operations which are performed for communicating with a terminal in a network formed of a plurality of network nodes including the base station, are executable by the base station or other network nodes excluding the base station. For example, the base station (BS) may be replaced with a term, such as, a fixed station, a Node B, an eNode B (eNB), an advanced base station (ABS), or an access point (AP), or the like. The terminal may be replaced with a term, such as a user equipment (UE), a subscriber station (SS), a mobile subscriber station (MSS), a mobile terminal, an advanced mobile station (AMS), a device, a terminal, a station (STA), or the like.

Figure 1:
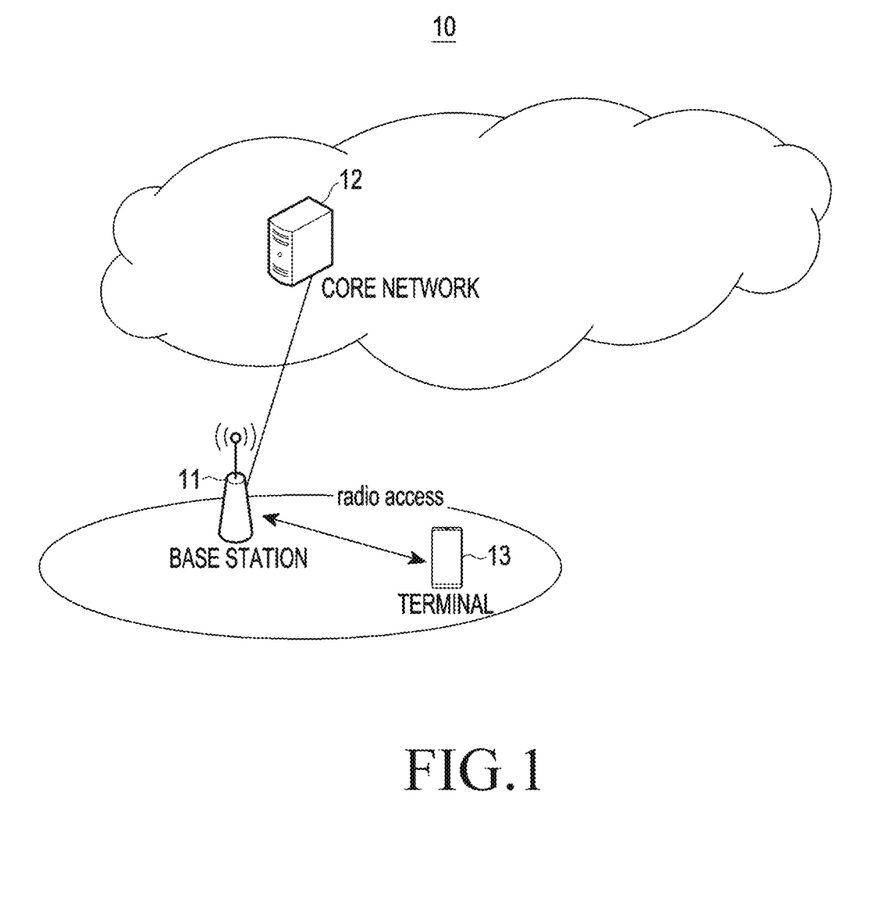
FIG. 1 is a diagram illustrating a wireless communication system according to an embodiment.

FIG. 1 is a diagram illustrating a wireless communication system 10 according to an embodiment.

Referring to FIG. 1, the wireless communication system 10 may include a base station 11, a core network 12, and a terminal 13. For example, the base station 11 may be connected to the terminal 13 with a radio channel.

According to an embodiment, the wireless communication system 10 may service user traffic via a shared channel. Therefore, the wireless communication system 10 may need a configuration (or a device) for collecting state information of the terminal 13 such as a buffer state, an available transmission power state, a channel state, or the like and to perform scheduling. For example, the scheduling may be performed by the base station 11.

According to an embodiment, generally, the base station 11 may control a plurality of cells. The wireless communication system 10 may have a bandwidth greater than the maximum bandwidth of an LTE system in order to implement ultra-high speed data transmission when compared to the LTE system. The wireless communication system 10 may use an orthogonal frequency division multiplexing (OFDM) as a radio access technology. Also, the wireless communication system 10 may use a beamforming technology. The wireless communication system 10 may apply an adaptive modulation & coding (AMC) scheme that determines a modulation scheme and a channel coding rate on the basis of the channel state of the terminal 13.

According to an embodiment, the core network 12 may perform functions such as supporting mobility, configuring a bearer, configuring QoS, and the like. The core network 12 may perform various control functions in addition to mobility management associated with the terminal 13. Also, the core network 12 may be connected to a plurality of base stations 11. Also, the wireless communication system 10 may interoperate with an LTE system via the core network 12.

According to an embodiment, the base station 11 and the terminal 13 may support a PT-RS in order to track phase noise of the wireless communication system 10 and to perform phase noise compensation. The base station 11 and the terminal 13 may share information (e.g., time and frequency density) of the PT-RS in order to support the PT-RS. For example, the base station 11 and the terminal 13 may share information associated with the PT-RS using a radio resource control (RRC) signaling. The base station 11 and the terminal 13 may share information associated with the PT-RS on the basis of a terminal capability report.

According to an embodiment, the base station 11 and the terminal 13 may derive the time and frequency density of the PT-RS using threshold values as shown in Tables 1 to 3 provided below. For example, the threshold values may include an $MCS_i$ corresponding to time density and an $N_{RBi}$ corresponding to frequency density. For example, the time density for the PT-RS may be as shown in Table 1.

TABLE 1

| Scheduled MCS | Time density ($L_{PT-RS}$) |
|---|---|
| $I_{MCS}$ < ptrs-$MCS_1$ | PTRS is not present |
| ptrs-MCS1 ≤ $I_{MCS}$ < ptrs-MCS2 | 4 |
| ptrs-MCS2 ≤ $I_{MCS}$ < ptrs-MCS3 | 2 |
| ptrs-MCS3 ≤ $I_{MCS}$ < ptrs-MCS4 | 1 |

According to an embodiment, the threshold value (MCS) of the time density corresponding to a PT-RS ranges from 0 to 29 which correspond to MCS indices in the case of MCS table 1 defined in the standard document, and the threshold value of the time density corresponding to a PT-RS ranges from 0 to 28 which corresponds to MCS indices in the case of MCS table 2. That is, a threshold value may need 5 bits to indicate the time density (MCS) in the range of 0 to 29 of MCS table 1, and may need 5 bits to indicate the time density (MCS) in the range of 0 to 28 of MCS table 2. Accordingly, the wireless communication system 10 may need 10 bits in order to indicate each threshold value of time density in a downlink (DL) or an uplink (UL). If three threshold values exist, the wireless communication system 10 may need a total of 30 bits for an uplink and a downlink. For example, $MCS_4$ may indicate 29 for MCS table 1, and may indicate 28 for MCS table 2.

According to an embodiment, two threshold values corresponding to two MCS tables may be configured by RRC, or may be reported by the terminal 13. However, whether to use MCS table 1 and MCS table 2 may be configured by a higher layer (RRC) and thus, a threshold value corresponding to an MCS table may be obtained according to the two options as follows:

i) Option 1: In a wireless communication system, two threshold values corresponding to two MCS tables may be reported irrespective of an MCS table configured by RRC configuration.

ii) Option 2: When a higher layer configures only a single MCS table for the terminal 13, the base station 11 may configure a threshold value configured for the single MCS table, and the terminal 13 may report the threshold value configured for the MCS table configured by the base station 11.

According to option 1, threshold values corresponding to two MCS tables are always reported and thus, overhead higher than that of option 2 may occur. However, the wireless communication system may also need to compress a threshold value for an MCS table in option 2, as well as option 1.

For example, when transform precoding is deactivated, the frequency density of a PT-RS may be indicated as shown in Table 2.

TABLE 2

| Scheduled bandwidth | Frequency density ($K_{PT-RS}$) |
|---|---|
| $N_{RB} < N_{RB0}$ | PTRS is not present |
| $N_{RB0} \leq N_{RB} < N_{RB1}$ | 2 |
| $N_{RB1} \leq N_{RB}$ | 4 |

For example, when transform precoding is activated, the frequency density of a PT-RS may be indicated as shown in Table 3.

TABLE 3

| Scheduled bandwidth | Number of PTRS groups | Number of samples per PTRS group |
|---|---|---|
| $N_{RB0} \leq N_{RB} < N_{RB1}$ | 2 | 2 |
| $N_{RB1} \leq N_{RB} < N_{RB2}$ | 2 | 4 |
| $N_{RB2} \leq N_{RB} < N_{RB3}$ | 4 | 2 |
| $N_{RB3} \leq N_{RB} < N_{RB4}$ | 4 | 4 |
| $N_{RB4} \leq N_{RB}$ | 8 | 4 |

The threshold value of a scheduled bandwidth ranges between a minimum value of 1 to a maximum value of 276. That is, a threshold value may need 9 bits in order to indicate 1 to 276 corresponding to frequency density. As shown in Table 3, when transform precoding is activated, 5 threshold values may be needed and thus, a total of 45 bits may be needed for an uplink.

Hereinafter, the following descriptions will propose four schemes to encode and compress threshold values of the time and frequency density of a PT-RS. The four schemes described hereinafter may be applied to the uplink of a discrete Fourier transform (DFT)-spread OFDM (SOFDM) or may be applied to the UL and DL of cyclic prefix (CP)-OFDM. However, a system capable of applying the four schemes to be described below is not limited thereto.

According to various embodiments, a first scheme may encode/compress threshold values of the time and frequency density of a PT-RS according to a uniform sampling grid scheme. The uniform sampling grid scheme indicates threshold values of the time density and the frequency density of a PT-RS using a uniform grid resource. For example, the grid resource may be a resource in two dimensions, including a time resource (e.g., OFDM symbol) and a frequency resource (e.g., subcarrier). That is, the uniform sampling grid scheme may compress the threshold values of the time and frequency density of the PT-RS using the grid resource.

According to an embodiment, the uniform sampling grid scheme may use a uniform grid resource (n) and may include the range of each threshold value of $[0:n_{MCS}:MCS_4]$ and $[0:n_{RB}:N_{RB}]$ for an MCS and a bandwidth (BW) as listed in Tables 4 to 6. Here, in the case of the MCS, $n_{MCS}$ may be as small as 1. In the case of the bandwidth (BW), $n_{RB}$ needs to be greater than or equal to the size of an RBG. When a relatively high value is selected for n which is a grid resource, a loss may occur when the threshold values of the time and frequency density of the PT-RS is encoded/compressed.

TABLE 4

| MSC threshold | Grid | Value Range |
|---|---|---|
| $MCS_1$ | n | $[0:n:MCS_4]$ |
| $MCS_2$ | n | $[0:n:MCS_4]$ |
| $MCS_3$ | n | $[0:n:MCS_4]$ |

For example, Table 5 indicates the range of a threshold value corresponding to frequency density using a uniform grid resource when transform precoding is deactivated.

TABLE 5

| $N_{RB}$ threshold | Grid | Value Range |
|---|---|---|
| $N_{RB0}$ | n | $[1:n:N_{RB}]$ |
| $N_{RB1}$ | n | $[1:n:N_{RB}]$ |

For example, Table 6 indicates the range of a threshold value corresponding to frequency density using a uniform grid resource when transform precoding is activated.

TABLE 6

| $N_{RB}$ threshold | Grid | Value Range |
|---|---|---|
| $N_{RB0}$ | n | $[1:n:N_{RB}]$ |
| $N_{RB1}$ | n | $[1:n:N_{RB}]$ |
| $N_{RB2}$ | n | $[1:n:N_{RB}]$ |
| $N_{RB3}$ | n | $[1:n:N_{RB}]$ |
| $N_{RB4}$ | n | $[1:n:N_{RB}]$ |

According to an embodiment, the uniform sampling grid scheme may subdivide the range of a threshold value according to $MCS_{i+1} = MCS_i$ and $NRB_{i+1} = NRB_i$, as shown in Table 7 to 9, and may reduce a payload size. For example, as shown in Table 7, in the case of $MCS_1$, the range of a threshold value may be $[0:n:MCS_4]$ since the grid resource n is used. In the case of $MCS_2$, the range of a threshold value may be [$MCS_1$:n:$MCS_4$] since the grid resource n is used. In the case of $MCS_3$, the range of a threshold value may be [$MCS_2$:n:$MCS_4$] since the grid resource n is used.

TABLE 7

| MSC threshold | Grid | Value Range |
|---|---|---|
| $MCS_1$ | n | [0:n:$MCS_4$] |
| $MCS_2$ | n | [$MCS_1$:n:$MCS_4$] |
| $MCS_3$ | n | [$MCS_2$:n:$MCS_4$] |

For example, Table 8 indicates the range of a threshold value corresponding to frequency density using a uniform grid resource when transform precoding is deactivated. In the case of $N_{RB0}$, the range of a threshold value may be [1:n:$N_{RB}$] since the grid resource n is used. In the case of $N_{RB1}$, the range of a threshold value may be [$N_{RB0}$:n:$N_{RB}$] since the grid resource n is used.

TABLE 8

| $N_{RB}$ threshold | Grid | Value Range |
|---|---|---|
| $N_{RB0}$ | n | [1:n:$N_{RB}$] |
| $N_{RB1}$ | n | [$N_{RB0}$:n:$N_{RB}$] |

For example, Table 9 indicates the range of a threshold value corresponding to frequency density using a uniform grid resource when transform precoding is deactivated. In the case of $N_{RB0}$, the range of a threshold value may be [1:n:$N_{RB}$] since the grid resource n is used. In the case of $N_{RB1}$, the range of a threshold value may be [$N_{RB0}$:n:$N_{RB}$] since the grid resource n is used. In the case of $N_{RB2}$, the range of a threshold value may be [$N_{RB1}$:n:$N_{RB}$] since the grid resource n is used. In the case of $N_{RB3}$, the range of a threshold value may be [$N_{RB2}$:n:$N_{RB}$] since the grid resource n is used. In the case of $N_{RB4}$, the range of a threshold value may be [$N_{RB3}$:n:$N_{RB}$] since the grid resource n is used.

TABLE 9

| $N_{RB}$ threshold | Grid | Value Range |
|---|---|---|
| $N_{RB0}$ | n | [1:n:$N_{RB}$] |
| $N_{RB1}$ | n | [$N_{RB0}$:n:$N_{RB}$] |
| $N_{RB2}$ | n | [$N_{RB1}$:n:$N_{RB}$] |
| $N_{RB3}$ | n | [$N_{RB2}$:n:$N_{RB}$] |
| $N_{RB4}$ | n | [$N_{RB3}$:n:$N_{RB}$] |

According to an embodiment, the uniform sampling grid scheme may sub-divide the range of a threshold value from the maximum threshold value as shown in Tables 10 to 12, thereby reducing a payload size. For example, as shown in Table 10, in the case of $MCS_1$, the range of a threshold value may be [0:n:$MCS_2$] since the grid resource n is used. In the case of $MCS_2$, the range of a threshold value may be [0:n:$MCS_3$] since the grid resource n is used. In the case of $MCS_3$, the range of a threshold value may be [0:n:$MCS_4$] since the grid resource n is used.

TABLE 10

| MSC threshold | Grid | Value Range |
|---|---|---|
| $MCS_1$ | n | [0:n:$MCS_2$] |
| $MCS_2$ | n | [0:n:$MCS_3$] |
| $MCS_3$ | n | [0:n:$MCS_4$] |

For example, Table 11 indicates the range of a threshold value corresponding to frequency density using a uniform grid resource when transform precoding is deactivated. In the case of $N_{RB0}$, the range of a threshold value may be [1:n:$N_{RB1}$] since the grid resource n is used. In the case of $N_{RB1}$, the range of a threshold value may be [1:n:$N_{RB}$] since the grid resource n is used.

TABLE 11

| $N_{RB}$ threshold | Grid | Value Range |
|---|---|---|
| $N_{RB0}$ | n | [1:n:$N_{RB1}$] |
| $N_{RB1}$ | n | [1:n:$N_{RB}$] |

For example, Table 12 indicates the range of a threshold value corresponding to frequency density using a uniform grid resource when transform precoding is deactivated. In the case of $N_{RB0}$, the range of a threshold value may be [1:n:$N_{RB1}$] since the grid resource n is used. In the case of $N_{RB1}$, the range of a threshold value may be [1:n:$N_{RB2}$] since the grid resource n is used. In the case of $N_{RB2}$, the range of a threshold value may be [1:n:$N_{RB3}$] since the grid resource n is used. In the case of $N_{RB3}$, the range of a threshold value may be [1:n:$N_{RB4}$] since the grid resource n is used. In the case of $N_{RB4}$, the range of a threshold value may be [1:n:$N_{RB}$] since the grid resource n is used.

TABLE 12

| $N_{RB}$ threshold | Grid | Value Range |
|---|---|---|
| $N_{RB0}$ | n | [1:n:$N_{RB1}$] |
| $N_{RB1}$ | n | [1:n:$N_{RB2}$] |
| $N_{RB2}$ | n | [1:n:$N_{RB3}$] |
| $N_{RB3}$ | n | [1:n:$N_{RB4}$] |
| $N_{RB4}$ | n | [1:n:$N_{RB}$] |

According to an embodiment, a grid resource corresponding to an MCS may include an additional bit in order to distinguish at least one of Tables 4, 7, or 10. For example, according to the uniform sampling grid scheme, in the case of $MCS_4$, 29 may be used as a threshold value to indicate the time density of a PT-RS.

According to various embodiments, a second scheme may encode/compress threshold values of the time and frequency density of a PT-RS according to a non-uniform sampling grid scheme. The non-uniform sampling grid scheme may be referred to as "grid matching the density value". The non-uniform sampling grid scheme may use a grid resource which is different for each threshold value as shown in Tables 13 to 15. For example, according to the non-uniform sampling grid scheme, $n_i=2^i$, $n_i=2^{i+1}$, or $n_i=2^{i-1}$, or $n_i=n^i$, $n_i=n^{i+1}$ or $n_i=n^{i-1}$ may be used as grid resources. Also, the value of a grid resource may be extended to $2^m$. Here, m may include 0, 1, . . . , and 9.

For example, as shown in Table 13, in the case of $MCS_3$, the range of a threshold value may be [0:$n_3$:$MCS_4$] since a grid resource $n_3$ is used. In the case of $MCS_2$, the range of a threshold value may be [0:$n_2$:$MCS_4$] since a grid resource $n_2$ is used. In the case of $MCS_1$, the range of a threshold value may be [0:$n_1$:$MCS_4$] since a grid resource $n_1$ is used. For example, $MCS_4$ may indicate 28 or 29.

TABLE 13

| MSC threshold | Grid | Value Range |
|---|---|---|
| $MCS_1$ | $n_1$ | [0:$n_1$:$MCS_4$] |
| $MCS_2$ | $n_2$ | [0:$n_2$:$MCS_4$] |
| $MCS_3$ | $n_3$ | [0:$n_3$:$MCS_4$] |

For example, Table 14 indicates the range of a threshold value corresponding to frequency density using a non-uniform grid resource when transform precoding is deactivated. In the case of $N_{RB0}$, the range of a threshold value may be $[1:n_0:N_{RB}]$ since a grid resource $n_0$ is used. In the case of $N_{RB1}$, the range of a threshold value may be $[1:n_1:N_{RB}]$ since a grid resource $n_1$ is used.

TABLE 14

| $N_{RB}$ threshold | Grid | Value Range |
| --- | --- | --- |
| $N_{RB0}$ | $n_0$ | $[1:n_0:N_{RB}]$ |
| $N_{RB1}$ | $n_1$ | $[1:n_1:N_{RB}]$ |

For example, Table 15 indicates the range of a threshold value corresponding to frequency density using a non-uniform grid resource when transform precoding is activated. In the case of $N_{RB0}$, the range of a threshold value may be $[1:n_0:N_{RB}]$ since a grid resource $n_0$ is used. In the case of $N_{RB1}$, the range of a threshold value may be $[1:n_1:N_{RB}]$ since a grid resource $n_1$ is used. In the case of $N_{RB2}$, the range of a threshold value may be $[1:n_2:N_{RB}]$ since a grid resource $n_2$ is used. In the case of $N_{RB3}$, the range of a threshold value may be $[1:n_3:N_{RB}]$ since a grid resource $n_3$ is used. In the case of $N_{RB4}$, the range of a threshold value may be $[1:n_4:N_{RB}]$ since a grid resource $n_4$ is used.

TABLE 15

| $N_{RB}$ threshold | Grid | Value Range |
| --- | --- | --- |
| $N_{RB0}$ | $n_0$ | $[1:n_0:N_{RB}]$ |
| $N_{RB1}$ | $n_1$ | $[1:n_1:N_{RB}]$ |
| $N_{RB2}$ | $n_2$ | $[1:n_2:N_{RB}]$ |
| $N_{RB3}$ | $n_3$ | $[1:n_3:N_{RB}]$ |
| $N_{RB4}$ | $n_4$ | $[1:n_4:N_{RB}]$ |

According to an embodiment, the non-uniform sampling grid scheme may subdivide the range of a threshold value according to $MCS_{i+1}=MCS_i$ and $N_{RBi+1}=NRB_i$, as shown in Table 16 to 18, and may reduce a payload size. For example, as shown in Table 13, in the case of $MCS_3$, the range of a threshold value may be $[MCS_2:n_3:MCS_4]$ since a grid resource $n_3$ is used. In the case of $MCS_2$, the range of a threshold value may be $[MCS_1:n_2:MCS_4]$ since a grid resource $n_2$ is used. In the case of $MCS_1$, the range of a threshold value may be $[0:n:MCS_4]$ since a grid resource $n_1$ is used.

TABLE 16

| MSC threshold | Grid | Value Range |
| --- | --- | --- |
| $MCS_1$ | $n_1$ | $[0:n_1:MCS_4]$ |
| $MCS_2$ | $n_2$ | $[MCS_1:n_2:MCS_4]$ |
| $MCS_3$ | $n_3$ | $[MCS_2:n_3:MCS_4]$ |

For example, Table 17 indicates the range of a threshold value corresponding to frequency density using a non-uniform grid resource when transform precoding is deactivated. In the case of $N_{RB0}$, the range of a threshold value may be $[1:n0:N_{RB}]$ since a grid resource $n_0$ is used. In the case of $N_{RB1}$, the range of a threshold value may be $[N_{RB0}:n_1:N_{RB}]$ since a grid resource $n_1$ is used.

TABLE 17

| $N_{RB}$ threshold | Grid | Value Range |
| --- | --- | --- |
| $N_{RB0}$ | $n_0$ | $[1:n_0:N_{RB}]$ |
| $N_{RB1}$ | $n_1$ | $[N_{RB0}:n_1:N_{RB}]$ |

For example, Table 18 indicates the range of a threshold value corresponding to frequency density using a non-uniform grid resource when transform precoding is activated. In the case of $N_{RB0}$, the range of a threshold value may be $[1:n_0:N_{RB}]$ since a grid resource $n_0$ is used. In the case of $N_{RB1}$, the range of a threshold value may be $[N_{RB0}:n_1:N_{RB}]$ since a grid resource $n_1$ is used. In the case of $N_{RB2}$, the range of a threshold value may be $[NRB_1:n_2:N_{RB}]$ since a grid resource $n_2$ is used. In the case of $N_{RB3}$, the range of a threshold value may be $[N_{RB2}:n_3:N_{RB}]$ since a grid resource $n_3$ is used. In the case of $N_{RB4}$, the range of a threshold value may be $[N_{RB3}:n_4:N_{RB}]$ since a grid resource $n_4$ is used.

TABLE 18

| $N_{RB}$ threshold | Grid | Value Range |
| --- | --- | --- |
| $N_{RB0}$ | $n_0$ | $[1:n_0:N_{RB}]$ |
| $N_{RB1}$ | $n_1$ | $[N_{RB0}:n_1:N_{RB}]$ |
| $N_{RB2}$ | $n_2$ | $[N_{RB1}:n_2:N_{RB}]$ |
| $N_{RB3}$ | $n_3$ | $[N_{RB2}:n_3:N_{RB}]$ |
| $N_{RB4}$ | $n_4$ | $[N_{RB3}:n_4:N_{RB}]$ |

According to an embodiment, the non-uniform sampling grid scheme may subdivide the range of a threshold value from the maximum threshold value as shown in Tables 19 to 21, thereby reducing a payload size. For example, as shown in Table 19, in the case of $MCS_3$, the range of a threshold value may be $[0:n_3:MCS_4]$ since a grid resource $n_3$ is used. In the case of $MCS_2$, the range of a threshold value may be $[0:n_2:MCS_3]$ since a grid resource $n_2$ is used. In the case of $MCS_1$, the range of a threshold value may be $[0:n_1:MCS_2]$ since a grid resource $n_1$ is used.

TABLE 19

| MSC threshold | Grid | Value Range |
| --- | --- | --- |
| $MCS_1$ | $n_1$ | $[0:n_1:MCS_2]$ |
| $MCS_2$ | $n_2$ | $[0:n_2:MCS_3]$ |
| $MCS_3$ | $n_3$ | $[0:n_3:MCS_4]$ |

For example, Table 20 indicates the range of a threshold value corresponding to frequency density using a non-uniform grid resource when transform precoding is deactivated. In the case of $N_{RB0}$, the range of a threshold value may be $[1:n_0:N_{RB1}]$ since a grid resource $n_0$ is used. In the case of $N_{RB1}$, the range of a threshold value may be $[1:n_1:N_{RB}]$ since a grid resource $n_1$ is used.

TABLE 20

| $N_{RB}$ threshold | Grid | Value Range |
| --- | --- | --- |
| $N_{RB0}$ | $n_0$ | $[1:n_0:N_{RB1}]$ |
| $N_{RB1}$ | $n_1$ | $[1:n_1:N_{RB}]$ |

For example, Table 21 indicates the range of a threshold value corresponding to frequency density using a non-uniform grid resource when transform precoding is activated. In the case of $N_{RB0}$, the range of a threshold value may be $[1:n_0:N_{RB1}]$ since a grid resource $n_0$ is used. In the case of $N_{RB1}$, the range of a threshold value may be $[1:n_1:N_{RB2}]$ since a grid resource $n_1$ is used. In the case of $N_{RB2}$, the range of a threshold value may be $[1:n_2:N_{RB3}]$ since a grid resource $n_2$ is used. In the case of $N_{RB3}$, the range of a threshold value may be $[1:n_3:N_{RB4}]$ since a grid resource $n_3$ is used. In the case of $N_{RB4}$, the range of a threshold value may be $[1:n_4:N_{RB5}]$ since a grid resource $n_4$ is used.

TABLE 21

| $N_{RB}$ threshold | Grid | Value Range |
|---|---|---|
| $N_{RB0}$ | $n_0$ | $[1:n_0:N_{RB1}]$ |
| $N_{RB1}$ | $n_1$ | $[1:n_1:N_{RB2}]$ |
| $N_{RB2}$ | $n_2$ | $[1:n_2:N_{RB3}]$ |
| $N_{RB3}$ | $n_3$ | $[1:n_3:N_{RB4}]$ |
| $N_{RB4}$ | $n_4$ | $[1:n_4:N_{RB}]$ |

As described above, the non-uniform sampling grid scheme may compress threshold values of the time and frequency density of a PT-RS without a loss. If a loss of the threshold values of the time and frequency density of the PT-RS is acceptable, the value of a grid resource n for the threshold values of the time and frequency density of the PT-RS may be multiples (e.g., k, 2 k and 4 k) of the time and frequency density values of the PT-RS. Here, k may indicate integer.

According to an embodiment, the uniform sampling grid or the non-uniform sampling grid may be further extended in order to reduce signaling overhead.

According to an embodiment, a grid resource corresponding to an MCS may include an additional bit to distinguish at least one of Tables 13, 16, or 19.

According to various embodiments, a third scheme may encode/compress threshold values of the time and frequency density of a PT-RS according to a combinational indexing scheme. The combinational indexing scheme may select m values from among M available values, and thus may support a total of $C_M^m$ combinations.

For example, in the case of an MCS table, a combinational index may be used in order to select three threshold values from among available values for $MCS_4$. In this instance, the number of bits needed in order to indicate a combinational index may be $\lceil \log_2(C_{MCS_4}^3) \rceil$.

For example, a bandwidth (BW) table in the state in which transform precoding is deactivated may need $\lceil \log_2(C_{N_{RB}}^2) \rceil$ bits in order to indicate a combinational index. In this instance, a loss may not occur when the threshold value of the frequency density of the PT-RS is compressed.

For example, the bandwidth (BW) table in the state in which transform precoding is activated may need $\lceil \log_2(C_{N_{RB}}^5) \rceil$ bits in order to indicate a combinational index.

According to an embodiment, when the time and frequency density values of a PT-RS are not always 1, the wireless communication system may compress threshold values of the time and frequency density of the PT-RS so as to use a smaller number of bits and to reduce a payload.

For example, the wireless communication system may uniformly scale a threshold value using a predetermined value k of the MCS table, in order to reduce a payload from $\lceil \log_2(C_{MCS_4}^3) \rceil$ to $$\lceil \log_2(C_{\lceil \frac{MCS_4}{k} \rceil}^3) \rceil.$$

For example, when $MCS_4=28$ and k=2, the number of bits needed to indicate a threshold value of the time density of a PT-RS may be reduced from 12 bits to 9 bits for each threshold value. Also, when two MCS tables and three threshold values are supported, the wireless communication system may save 18 bits.

For example, when transform precoding is deactivated, the wireless communication system may uniformly scale a threshold value of the BW table using a predetermined value k, and may reduce a payload from $\lceil \log_2(C_{N_{RB}}^2) \rceil$ to $$\lceil \log_2(C_{\lceil \frac{N_{RB}}{k} \rceil}^2) \rceil.$$

Here, k may be greater than or equal to the size of an RBG. For example, when $N_{RB}=276$ and k=2, the number of bits needed to indicate a threshold value of the frequency density of a PT-RS may be reduced from 16 bits to 14 bits. That is, the wireless communication system may save four bits for two threshold values.

For example, when transform precoding is activated, the wireless communication system may uniformly scale a threshold value of the BW table using a predetermined value k, and may reduce a payload from $\lceil \log_2(C_{N_{RB}}^5) \rceil$ to $$\lceil \log_2(C_{\lceil \frac{N_{RB}}{k} \rceil}^5) \rceil.$$

For example, when $N_{RB}=276$ and k=2, the number of bits needed to indicate a threshold value of the frequency density of a PT-RS may be reduced from 34 bits to 29 bits. That is, the wireless communication system may save 25 bits for five threshold values.

For example, when a scaling coefficient k is greater than 1, the combinational indexing scheme may cause a little loss for the MCS density table.

According to an embodiment, the combinational indexing scheme may apply a scaling coefficient corresponding to a density table value, instead of using a uniform scaling coefficient. For example, k for different threshold values may include $2^n$.

For example, in the case of the MCS table, $MCS_3$ may be selected from all $MCS_4$ values, and when a scaling factor is $k_3$, the number of hits to indicate the threshold value of the time density of a PT-RS may include $$\lceil \log_2(C_{\lceil \frac{MCS_4}{k_3} \rceil}^1) \rceil.$$

In the case of $MCS_2$, the range of a threshold value may be selected from $[0, MCS_3]$, and the number of bits to indicate the threshold value of the time density of a PT-RS may include $$\lceil \log_2(C_{\lceil \frac{MCS_3}{k_2} \rceil}^1) \rceil.$$

In this instance, the number of bits to indicate the threshold value of the time density of the PT-RS may be scaled using $k_2$. In the case of $MCS_1$, the range of a threshold value may be selected from $[0, MCS_2]$, and the number of bits to indicate the threshold value of the time density of a PT-RS may include $$\lceil \log_2 (C^1_{\lceil \frac{MCS_2}{k_1} \rceil}) \rceil.$$

In this instance, the number of bits to indicate the threshold value of the time density of the PT-RS may be scaled using $k_1$.

For example, in the case of the BW table, $NRB_0$ may be selected from all NRB values, and when a scaling coefficient is $k_0$, the number of bits to indicate the threshold value of the frequency density of a PT-RS may include $$\lceil \log_2 (C^1_{\lceil \frac{N_{RB}}{k_0} \rceil}) \rceil.$$

When $NRB_i$ may be selected from the values in the range of $[NRB_i-1, NRB]$ and when a scaling coefficient is $k_i$, the number of bits to indicate a threshold value of the frequency density of a PT-RS may include $$\lceil \log_2 (C^1_{\lceil \frac{N_{RB}-N_{RB_i}}{k_i} \rceil}) \rceil.$$

For example, combinational indexing may be additionally corrected. The threshold values of the time and frequency density of a PT-RS may be divided into various groups (e.g., two groups $\{MCS_1\}$ and $\{MCS_2, MCS_3\}$). A scaling factor which is different for each group may be used. For example, the scaling factor of $MCS_1$ is 1 and thus, $\lceil \log_2(C_{MCS_4}^{1}) \rceil$ bits may be needed. The scaling factor of $MCS_2$ and $MCS_3$ is 2 and thus, $$\lceil \log_2 (C^2_{\lceil \frac{MCS_4}{2} \rceil}) \rceil$$

bits may be needed.

For example, when the combinational indexing scheme is used, a mapping table including the mapping relationship between a binary sequence and an actual threshold value, such as Table 22 provided below, may be needed.

TABLE 22

| $N_{RB0}$ | $N_{RB1}$ | Index (bitwidth = $\lceil \log_2 (C_{N_{RB}}^2) \rceil$ = 16) |
|---|---|---|
| 1 | 1 | 000000000000 |
| 1 | 2 | 000000000001 |
| 1 | 3 | 000000000010 |
| 1 | 4 | 000000000011 |
| 1 | 5 | 000000000100 |
| ... | ... | ... |

In the case of mapping, a codebook or code conversion table may be used, which codes a generally used MCS range or RB size into a codeword having the lowest length, and reduces an average overhead associated with a system (or cell).

According to various embodiments, a fourth scheme may encode/compress threshold values of the time and frequency density of a PT-RS by imposing a limit on each threshold value. That is, the wireless communication system may impose a limit on at least one threshold value corresponding to the time and frequency density of a PT-RS. For example, in the case of $NRB_0$, the range of a threshold value of the frequency density of a PT-RS is $[1, n_{RB}]$ and $n_{RB} < N_{RB}$, and thus, only $\log_2(n_{RB})$ bits may be used instead of $\log_2(N_{RB})$ bits. In the case of $MCS_1$, when it is determined that a PT-RS is not to be used for QPSK, the range of a threshold value of the time density of a PT-RS is reduced to [10, 29] in the case of the MCS table with up to 64QAM, and the range is reduced to [5, 28] in the case of the MCS table with 256QAM. In this instance, the number of bits to indicate threshold values of the time and frequency density of a PT-RS may be reduced from 10 to 8.

According to an embodiment, the four schemes used for encoding/compressing threshold values of the time and frequency density of a PT-RS may be combined. For example, when the uniform sampling grid scheme and the scheme of imposing a limit on a threshold are combined, threshold values of the time and frequency density of a PT-RS may be listed as shown in Tables 23 to 25. In this instance, $n_{RB}=3$ or 5 may be included.

For example, when the uniform sampling grid scheme and the scheme of imposing a limit on a threshold are combined, the threshold value of the time density of a PT-RS may be listed as shown in Table 23.

TABLE 23

| MSC threshold | Grid | Value Range |
|---|---|---|
| $MCS_1$ | n | [10 or 5:n:$MCS_4$] |
| $MCS_2$ | n | [10 or 5:n:$MCS_4$] |
| $MCS_3$ | n | [10 or 5:n:$MCS_4$] |

For example, when the uniform sampling grid scheme and the scheme of imposing a limit on a threshold are combined and transform precoding is deactivated, the threshold value of the frequency density of a PT-RS may be listed as shown in Table 24.

TABLE 24

| $N_{RB}$ threshold | Grid | Value Range |
|---|---|---|
| $N_{RB0}$ | n | [1:n:3 or 5] |
| $N_{RB1}$ | n | [1:n:$N_{RB}$] |

For example, when the uniform sampling grid scheme and the scheme of imposing a limit on a threshold are combined and transform precoding is activated, the threshold value of the frequency density of a PT-RS may be listed as shown in Table 25.

TABLE 25

| $N_{RB}$ threshold | Grid | Value Range |
|---|---|---|
| $N_{RB0}$ | n | [1:n:3 or 5] |
| $N_{RB1}$ | n | [1:n:$N_{RB}$] |
| $N_{RB2}$ | n | [1:n:$N_{RB}$] |
| $N_{RB3}$ | n | [1:n:$N_{RB}$] |
| $N_{RB4}$ | n | [1:n:$N_{RB}$] |

According to an embodiment, each table may use a different scheme to encode/compress a threshold value. For example, an MCS table may use the uniform sampling grid scheme, a bandwidth table with deactivated transform precoding may use the non-uniform sampling grid scheme, and a bandwidth table with activated transform precoding may use the combinational indexing scheme, so as to encode/compress threshold values of the time and frequency density of a PT-RS.

According to an embodiment, in the case of a BW table for DFT-s-OFDM, another parameter in addition to a threshold value set that needs to be encoded may be a chunk location for a chunk size of 4. In this instance, the chunk location may include the head and tail of an OFDM symbol. The tail chunk may not be used since the tail chunk is out of a reception window due to asynchronization at a reception side, and thus, performance loss may occur. According to another method, all chunks or at least a tail chunk may be moved to the middle of a time interval according to the following schemes.

Option 1: When a chunk size is 4, whether to move the last chunk or all chunks to the middle of a time interval may be configured by a higher layer signaling (e.g., RRC). In this instance, one bit may be used to encode the information.

Option 2: Whether to move the last chunk or all chunks to the middle of a time interval, when a chunk size of 4, may be configured as a terminal (UE) feature/capability and may be reported by a terminal. A base station (gNB) may determine and configure a pattern to be used using a higher layer signaling such as RRC. In this instance, one bit may be used to encode the information.

Option 3: A base station is capable of switching off a chunk pattern (2, 4) using two chunks and each chunk may have 4 PT-RS samples. In this instance, different patterns (e.g., (4, 2)) may always be used.

For example, different patterns associated with a chunk size of 4 may be configured on the basis of a higher layer base station (gNB) configuration or a terminal feature/capability.

Figure 2:
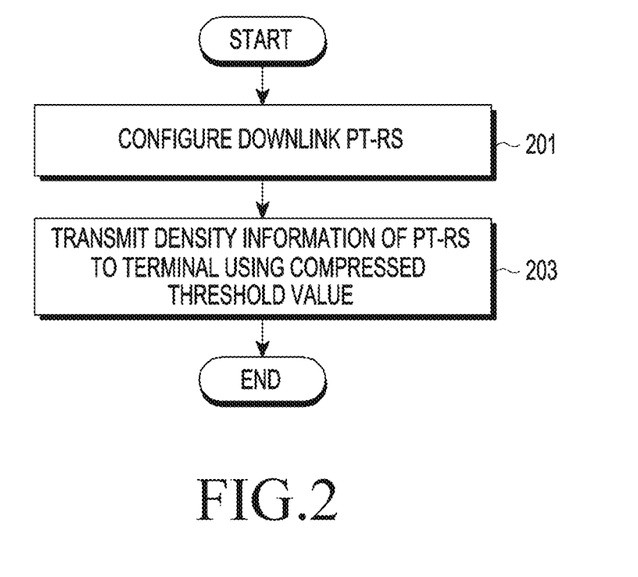
FIG. 2 is a flowchart illustrating a process of providing information associated with the density of a PT-RS by a base station according to an embodiment.

FIG. 2 is a flowchart illustrating a process of providing information associated with the density of a PT-RS by a base station according to an embodiment.

Referring to FIG. 2, a base station configures a downlink PT-RS in operation 201. For example, the base station may determine the time density and the frequency density of a PT-RS which is transmitted such that a terminal is capable of measuring phase noise.

The base station may transmit configuration information of the downlink PT-RS to a terminal in operation 203. For example, the base station may add the time and frequency density of the downlink PT-RS to at least one of PDCCH configuration information and PDSCH configuration information, and transmit the same to the terminal. In this instance, the time and frequency density of the PT-RS may be expressed using threshold values of the time and frequency density of the PT-RS which are compressed on the basis of at least one of a uniform sampling grid scheme, a non-uniform sampling grid scheme, a combinational indexing scheme, or a scheme of imposing a limit. For example, the base station may compress information associated with PTRS using at least one of a uniform sampling grid scheme, a non-uniform sampling grid scheme, a combinational indexing scheme, or a scheme of imposing a limit. Herein, the compressed information associated with PTRS includes threshold information in one or more of an MCS table and a BW table.

Figure 3:
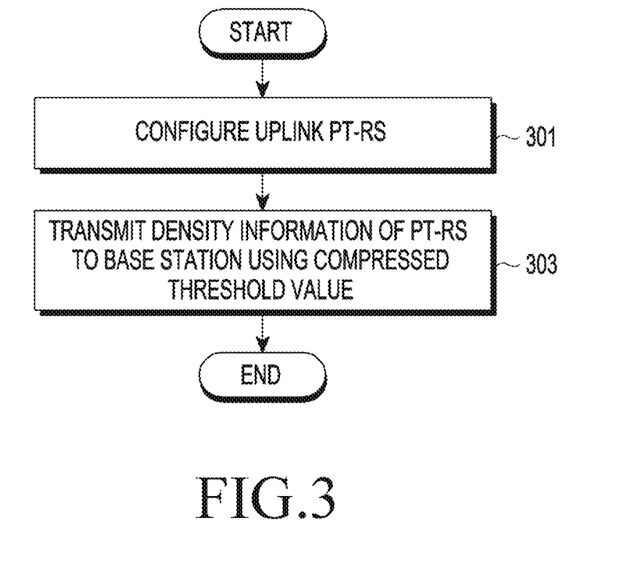
FIG. 3 is a flowchart illustrating a process of providing information associated with the density of a PT-RS by a terminal according to an embodiment.

FIG. 3 is a flowchart illustrating a process of providing information associated with the density of a PT-RS by a terminal according to an embodiment.

Referring to FIG. 3, a terminal configures an uplink PT-RS that corresponds to a base station in operation 301. For example, the terminal may determine the time density and the frequency density of a PT-RS which is transmitted such that the base station is capable of measuring phase noise.

The terminal may add the configuration information of the uplink PT-RS to a terminal's report message, and may transmit the same to the base station in operation 303. For example, the terminal may add the time and frequency density of the uplink PT-RS to a UE report, and may transmit the same to the base station. In this instance, the time and frequency density of the PT-RS may be expressed using threshold values of the time and frequency density of the PT-RS which are compressed on the basis of at least one of a uniform sampling grid scheme, a non-uniform sampling grid scheme, a combinational indexing scheme, or a scheme of imposing a limit. For example, the terminal may compress information associated with PTRS using at least one of a uniform sampling grid scheme, a non-uniform sampling grid scheme, a combinational indexing scheme, or a scheme of imposing a limit. Herein, the compressed information associated with PTRS includes threshold information in one or more of an MCS table and a BW table.

Figure 4:
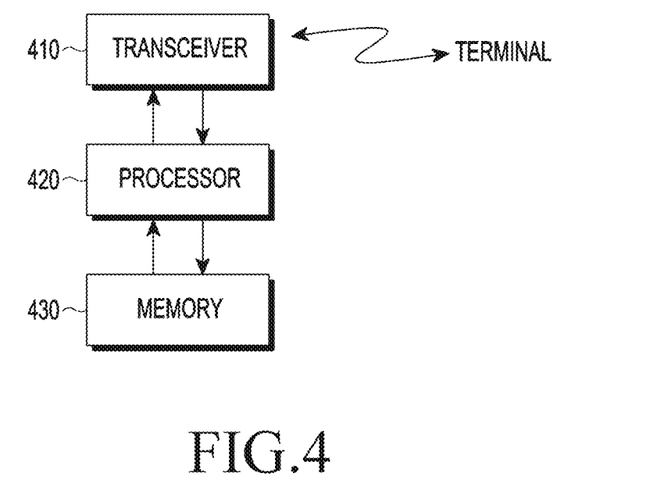
FIG. 4 is a block diagram illustrating a base station for providing information associated with the density of a PT-RS according to an embodiment.

FIG. 4 is a block diagram illustrating a base station for providing information associated with the density of a PT-RS according to an embodiment.

Referring to FIG. 4, a base station may include a transceiver 410, at least one processor 420, and a memory 430. The transceiver 410 may exchange a radio signal with a terminal.

The processor 420 may be configured to operate according to at least one of the above-described embodiments or a combination of at least two thereof. For example, the time and frequency density of a PT-RS to be transmitted to a terminal may be expressed using threshold values of the time and frequency density of the PT-RS which are compressed on the basis of at least one of a uniform sampling grid scheme, a non-uniform sampling grid scheme, a combinational indexing scheme, or a scheme of imposing a limit. For example, the processor 420 may be configured to compress information associated with PTRS using at least one of a uniform sampling grid scheme, a non-uniform sampling grid scheme, a combinational indexing scheme, or a scheme of imposing a limit. Herein, the compressed information associated with PTRS includes threshold information in one or more of an MCS table and a BW table.

The memory 430 may store parameters, data, program codes, and the like which are required when the processor 420 operates.

Figure 5:
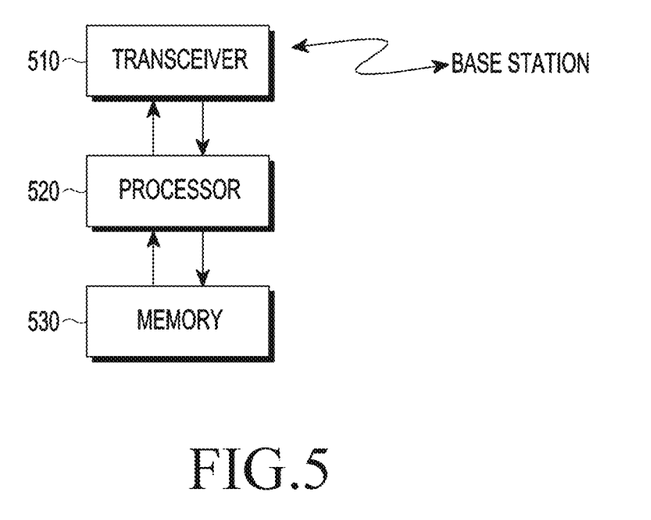
FIG. 5 is a block diagram illustrating a terminal for providing information associated with the density of a PT-RS according to an embodiment.

FIG. 5 is a block diagram illustrating a terminal for providing information associated with the density of a PT-RS according to an embodiment.

Referring to FIG. 5, a user terminal may include a transceiver 510, at least one processor 520, and a memory 530.

The transceiver 510 may exchange a radio signal with one or more base stations.

The processor 520 may be configured to operate according to at least one of the above-described embodiments or a combination of at least two thereof. For example, the time and frequency density of a PT-RS to be transmitted to a base station may be expressed using threshold values of the time and frequency density of the PT-RS which are compressed on the basis of at least one of a uniform sampling grid scheme, a non-uniform sampling grid scheme, a combinational indexing scheme, or a scheme of imposing a limit. For example, the processor 520 may be configured to compress information associated with PTRS using at least one of a uniform sampling grid scheme, a non-uniform sampling grid scheme, a combinational indexing scheme, or a scheme of imposing a limit. Herein, the compressed information associated with PTRS includes threshold information in one or more of an MCS table and a BW table.

The memory 530 may store parameters, data, program codes, and the like which are required when the processor 520 operates.

Particular aspects of the disclosure may be implemented as a computer-readable code in a computer-readable recording medium. The computer-readable recording medium is a predetermined data storage device which can store data which can be read by a computer system. Examples of the computer readable recording medium may include a Read-Only Memory (ROM), a Random Access Memory (RAM), a CD-ROM, a magnetic tape, a floppy disk, an optical data storage device, and a carrier wave (such as data transmission through the Internet). The computer-readable recording medium may be distributed through computer systems connected to the network, and accordingly the computer-readable code is stored and executed in a distributed manner. Further, functional programs, codes and code segments for achieving the disclosure may be easily interpreted by programmers skilled in the art which the disclosure pertains to.

It will be understood that a method and apparatus according to an embodiment of the disclosure may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be appreciated that the method according to various embodiments of the disclosure may be implemented by a computer or portable terminal including a controller and a memory, wherein the memory is one example of machine-readable storage media suitable to store a program or programs including instructions for implementing the embodiments of the disclosure.

Accordingly, the disclosure includes a program for a code implementing the apparatus and method described in the appended claims of the specification and a machine (a computer or the like)-readable storage medium for storing the program. Further, the program may be electronically carried by any medium such as a communication signal transferred through a wired or wireless connection, and the disclosure appropriately includes equivalents thereof.

Further, an apparatus according to various embodiments of the disclosure may receive the program from a program providing device that is wiredly or wirelessly connected thereto, and may store the program. The program providing device may include a program including instructions through which a program processing device performs a preset content protecting method, a memory for storing information and the like required for the content protecting method, a communication unit for performing wired or wireless communication with the program processing device, and a controller for transmitting the corresponding program to a transceiver at the request of the program processing device or automatically.

Meanwhile, the exemplary embodiments disclosed in the specification and drawings are merely presented to easily describe technical contents of the disclosure and help the understanding of the disclosure and are not intended to limit the scope of the disclosure. Further, the embodiments of the disclosure as described above are merely illustrative, and it will be understood by those skilled in the art that various modifications and equivalents thereof are possible within the scope of the disclosure. Therefore, the true technical scope of protection of the disclosure should be defined by the following appended claims.

The invention claimed is:

1. A method of reducing a signaling overhead by a base station in a wireless communication system, the method comprising:
   identifying compression information associated with at least one of a time density of a PTRS (phase tracking reference signal) and a frequency density of the PTRS; and
   transmitting, to a user equipment (UE), the compression information via a RRC (radio resource control) signaling,
   wherein the compression information is determined based on a non-uniform sampling grid.

2. The method of claim 1, wherein the compression information associated with at least one of the time density of the PTRS and the frequency density of the PTRS comprises threshold information in one or more of an MCS (modulation and coding scheme) table and a BW (bandwidth) table.

3. The method of claim 1,
   wherein the non-uniform sampling grid is associated with a value of $2^m$, where m=0, 1, . . . , 9.

4. The method of claim 1,
   wherein a combinatorial indexing is further used to determine the compression information.

5. The method of claim 1, wherein the compression information is used for both CP(cyclic prefix)-OFDM(orthogonal frequency division multiplexing) and DFT (discrete fourier transform)-s(spread)-OFDM.

6. A base station for reducing a signaling overhead in a wireless communication system, the base station comprising:
   a transceiver; and
   a controller coupled with the transceiver and configured to control to:
   identify compression information associated with at least one of a time density of a PTRS (phase tracking reference signal) and a frequency density of the PTRS, and
   transmit, to a user equipment (UE), the compression information via a RRC (radio resource control) signaling,
   wherein the compression information is determined based on a non-uniform sampling grid.

7. The base station of claim 6, wherein the compression information associated with at least one of the time density of the PTRS and the frequency density of the PTRS comprises threshold information in one or more of an MCS (modulation and coding scheme) table and a BW (bandwidth) table.

8. The base station of claim 6, wherein the non-uniform sampling grid is associated with a value of $2^m$, where m=0, 1, . . . , 9.

9. The base station of claim 6, wherein a combinatorial indexing is further used to determine the compression information.

10. The base station of claim 6, wherein the compression information is used for both CP(cyclic prefix)-OFDM(orthogonal frequency division multiplexing) and DFT(discrete fourier transform)-s(spread)-OFDM.

* * * * *

UNITED STATES PATENT AND TRADEMARK OFFICE
CERTIFICATE OF CORRECTION

PATENT NO. : 11,489,644 B2
APPLICATION NO. : 16/969957
DATED : November 1, 2022
INVENTOR(S) : Qi et al.

It is certified that error appears in the above-identified patent and that said Letters Patent is hereby corrected as shown below:

On the Title Page

Item [30], reads "GB 1802545" should read -- GB 1802545.2 --.

Signed and Sealed this
Third Day of January, 2023

Katherine Kelly Vidal
Director of the United States Patent and Trademark Office